(No Model.)
A. S. KROTZ & W. W. SPENCER.
SECONDARY BATTERY.
No. 552,322. Patented Dec. 31, 1895.
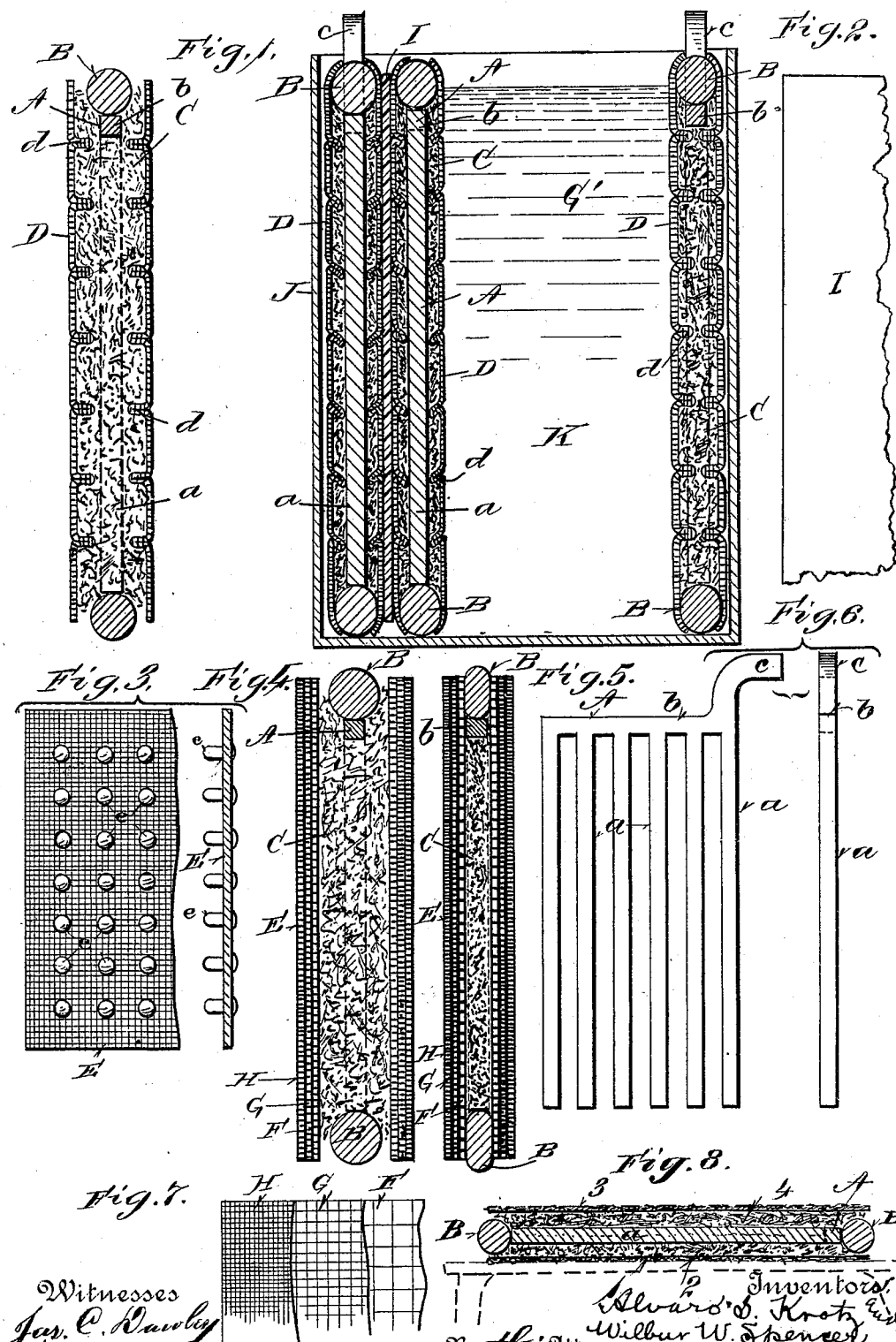

UNITED STATES PATENT OFFICE.

ALVARO S. KROTZ AND WILBUR W. SPENCER, OF SPRINGFIELD, OHIO.

SECONDARY BATTERY.

SPECIFICATION forming part of Letters Patent No. 552,322, dated December 31, 1895.

Application filed January 31, 1895. Serial No. 536,798. (No model.)

*To all whom it may concern:*

Be it known that we, ALVARO S. KROTZ and WILBUR W. SPENCER, citizens of the United States, residing at Springfield, in the county of Clark and State of Ohio, have invented certain new and useful Improvements in Secondary Batteries, of which the following is a specification, reference being had therein to the accompanying drawings.

This invention relates to an improved secondary or storage battery.

We have two particular objects in view, which are accomplished by this invention, to wit: such a construction and organization as to secure maximum porosity of the active material of the battery, with the resulting better circulation of the electrolyte and consequent efficiency or voltage, and as to secure minimum disintegration and falling away of the active material, with the result of increasing the durability and life of the battery. These objects we successfully carry into practice by the construction and organization shown in the drawings, wherein—

Figure 1 is a cross-sectional view of one of our improved battery-plates in a partially finished condition; Fig. 2, a similar sectional view of a battery formed of a number of such plates and placed in a suitable cell, showing also a side view of a portion of one of the insulators; Fig. 3, a detail elevation and a sectional view of a modified form of holding material; Fig. 4, a cross-sectional view of our battery-plate with another form of holding material, showing the plate in a partially-finished condition; Fig. 5, a similar view of the same form in a finished condition; Fig. 6, a detail side and edge view of the conductor; Fig. 7, a side view of a portion of the form of holding material shown in Figs. 4 and 5, illustrating the different grades of interstices; and Fig. 8 a sectional view of the battery-plate, showing another form of holding material.

At A is shown the conductor, which consists of a series of bars $a$ united at one end by a head $b$ and provided with a terminal $c$. This conductor is preferably made of lead. The conductors of those plates which are intermediate of the outer ones in an organized battery of numerous cells will ordinarily each be provided with the terminal $c$, as the latter is used to connect the plates with each other and with the line-wire. This conductor is encompassed by a retaining web or cord B of asbestos or some other suitable material adapted to withstand the action of the electrolyte and preferably somewhat compressible, so as to give to that step in the process of the production of our battery-plates which consists in the application of pressure, as will hereinafter appear. This retaining-web being of greater diameter or thickness than the thickness of the conductor A affords shoulders or retaining-walls for the active material. This material is designated C and is shown by means of irregular dots and scattering short lines. It is applied to one of the holding-sheets D by laying the sheet in a horizontal position. Then the conductor is placed on the layer of active material, and then the other holding-plate is applied, either directly against the conductor or with some of the active material intervening. Having so applied the active material, which we would observe is preferably in a semiplastic state at the time of application, we next apply the pressure to bind the different elements together and make the holding material and active material intimately unite. This material we have shown in three forms, the preferred form being illustrated in Figs. 1 and 2, the next preferred in Fig. 3 and the least preferred in Figs. 4, 5 and 7. This holding material is shown at D in Figs. 1 and 2, at E in Fig. 3 and at F, G and H in Figs. 4, 5 and 7. All of these forms consist of sheets of woven asbestos fabric. This material being woven provides interstices, which are mechanically formed, and by reason of its molecular structure provides pores, so that both mechanically-formed interstices and molecularly-formed pores are in our holding material.

In form D the sheets are folded at intervals into loops $d$, which form ridges that extend across the sheet. One of these sheets of holding material is applied at each side of the conductor A or active material C, as shown in Figs. 1 and 2, and then by the application of pressure, by means of a press or in any other desired way, the sheets of holding material are forced toward each other and the active material compressed between them, causing the latter to fill into the interstices of the fabric and causing the ridges $d$ to bend or fold more or less toward the sheets proper, thus forming sort of receptacles between each two ridges in which the active material is held. This material also works its way through the meshes of the ridges, so that the ridges do not constitute obstructions to the circulation of the electrolyte, but are porous in the same sense that the sheets of folding material are porous. This construction holds the active material so perfectly intact that it cannot scale off or disintegrate with the usual objectionable rapidity. At the same time the porosity and interstices of the structure afford the maximum circulation of the electrolyte with the attendant result of increased efficiency or voltage of current. The thousands upon thousands of almost infinitesimal passages formed by the interstices of these unbroken reticulated sheets form gateways for the reception and passage of electricity, being closed only by the filling or filaments of active material. Then the meshes of the ridges prevent them from constituting serious obstructions to the circulation, while the ridges hold the electrolyte and subdivide or break it up into a number of sub-sections to the extent that the ridges are embedded in it, thus holding it at so many points that it cannot settle down in the upper part, should disintegration occur more rapidly in the lower part. Then, too, these ridges stiffen the holding material, and hence add to the efficiency of these sheets of fabric.

The same remarks apply to form E of holding material, (shown at Fig. 3,) which is composed of sheets of asbestos fabric with asbestos tufts or knobs $e$ which act after the manner of the ridges $d$ in the form shown in Figs. 1 and 2.

Referring now to Figs. 4 and 5, all of the above description applies save that relating especially to the specific form of holding material shown at D and E. In these latter figures we employ one or more sheets of asbestos fabric without ridges or tufts. Because of the absence of these features we prefer two or three layers, (shown at F, G, and H,) and we make layer F the coarsest mesh of the three layers, layer G somewhat finer, and layer H the finest of the three. When the plate is subjected to pressure the active material works its way more or less between the layers or sheets of this holding material as well as fills the interstices of the respective layers. This form of our holding material renders the holding material less open, mechanically speaking, than the other two forms described, and this brings us to a selection of active material, preferably using one composition for the forms shown in Figs. 1, 2 and 3, respectively, and another for that shown in Figs. 4 and 5. The active material for the forms shown in Figs. 1, 2, and 3 will preferably be composed of red lead and litharge in the usual proportions, while for the forms shown in Figs. 4 and 5 we add as a third ingredient asbestos fiber to increase the porosity commensurate with the greater fineness or reduced reticulation of the holding material. The several sheets of holding material in Figs. 4 and 5 also stiffen the same. After compression the plates are subjected to the usual baking process to set the active material.

In Fig. 2 we have illustrated a number of our battery-plates organized into a battery with the necessary intervening insulators I, formed preferably of vulcanized rubber, as usual, the same being placed in a suitable cell G', containing any of the usual electrolytes K.

We have already described three forms of holding material with the common feature of interstices and porosity.

We will now describe the third form of holding material possessing this common feature. Such third form consists in making the holding material of a layer of asbestos fiber in this wise, to wit: On a suitable table we spread a layer of such fiber. On top of this we place a layer of active material composed preferably of two ingredients, as above named. Following this we place the conductor on this layer of active material, and finally we sprinkle another layer of asbestos fiber, which falls on top of the conductor and, passing between its bars, covers the exposed active material. In some cases we, however, prefer to sprinkle or place a layer of active material between the conductor and the last layer of fiber above stated. This construction is illustrated in Fig. 8, wherein 1 is the first layer of asbestos fiber; 2, the layer of active material; A, the conductor; 3, the final layer of asbestos fiber, and 4 the intervening second layer of active material, should we employ it. The structure thus built up is then subjected to pressure, which results in producing a plate wherein the holding material is porous and reticulated and it and the active material are intimately united, as stated in reference to the other forms.

Now it will be observed that in our battery-plate there runs through the four forms the common feature or element of intimate union of the active material and the holding material in the plate as finally finished, due to the compression of the active material and porous holding material while the former is in a semiplastic state, and that, further, the conductor is merely within the body of active material and is not depended upon to support or hold it, that being done by the holding material. Thus our battery-plate is compact and solid in the sense of strength, while possessed of a high or maximum reticulation and porosity through and through from surface to surface, while also possessed of a very low or minimum degree of disintegration.

In some cases we will use the active material composed of the three ingredients above mentioned in the form shown in Figs. 1, 2, and 3. In some cases, however, we may use, in the form shown in Figs. 4 and 5, the active material composed of the two ingredients only.

It will also be understood that the electrolyte communicates with the active material through the filaments in the interstices of the holding material, and also through the porosity of said holding material.

Having thus fully described our invention, what we claim as new, and desire to secure by Letters Patent, is—

1. A storage or secondary battery plate, consisting of a conductor, a quantity of active material, and sheets of porous holding material having interior porous projections, the latter materials being pressed together so that one fills through and through into the interstices of the other and through and through its porous projections, to form innumerable exposed attenuated filaments of active material and numerous interior filaments through said porous projections.

2. In a storage or secondary battery plate, a holding material of asbestos fabric and active material composed of lead, litharge, and asbestos fiber mixed, and a conductor, the said active material extending through and through the interstices of the holding material whereby the active material is supported and whereby it forms innumerable exposed filaments.

3. In a storage or secondary battery plate, a holding material of porous sheets provided with porous projections on the inner side, and an active material intimately compressed into the interstices of the porous sheets and projections and extending through and through at least the sheets to form innumerable exposed attenuated filaments.

4. In a storage or secondary battery plate, a holding material of porous asbestos fabric folded to form interior ridges, and an active material intimately united with said folded material and its ridges by compression.

In testimony whereof we affix our signatures in presence of two witnesses.

ALVARO S. KROTZ.
WILBUR W. SPENCER.

Witnesses:
W. M. McNair,
Jas. C. Dawley, Jr.